US011421074B2

(12) United States Patent
Walker

(10) Patent No.: US 11,421,074 B2
(45) Date of Patent: Aug. 23, 2022

(54) ADHESIVE MATERIAL, AND METHOD OF USE THEREOF

(71) Applicant: Zephyros, Inc., Romeo, MI (US)

(72) Inventor: Jason Walker, Lenox, MI (US)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 15/545,869

(22) PCT Filed: Feb. 1, 2016

(86) PCT No.: PCT/US2016/015887
§ 371 (c)(1),
(2) Date: Jul. 24, 2017

(87) PCT Pub. No.: WO2016/123597
PCT Pub. Date: Aug. 4, 2016

(65) Prior Publication Data
US 2018/0016388 A1    Jan. 18, 2018

Related U.S. Application Data

(60) Provisional application No. 62/109,719, filed on Jan. 30, 2015.

(51) Int. Cl.
| | |
|---|---|
| *C08G 59/40* | (2006.01) |
| *C08K 3/016* | (2018.01) |
| *C08K 5/00* | (2006.01) |
| *C08L 63/00* | (2006.01) |
| *C09J 11/08* | (2006.01) |
| *C09J 163/00* | (2006.01) |
| *C08K 3/32* | (2006.01) |

(52) U.S. Cl.
CPC ......... *C08G 59/4014* (2013.01); *C08G 59/40* (2013.01); *C08K 3/016* (2018.01); *C08K 5/0066* (2013.01); *C08L 63/00* (2013.01); *C09J 11/08* (2013.01); *C09J 163/00* (2013.01); *C08K 2003/323* (2013.01); *C09J 2301/50* (2020.08)

(58) Field of Classification Search
None
See application file for complete search history.

(56) References Cited

U.S. PATENT DOCUMENTS

| | | | |
|---|---|---|---|
| 4,061,812 A | 12/1977 | Gilwee et al. | |
| 4,181,780 A | 1/1980 | Brenner | |
| 4,299,872 A | 11/1981 | Miguel et al. | |
| 5,187,203 A | 2/1993 | Lenox | |
| 5,650,448 A | 7/1997 | Wallace | |
| 5,719,199 A | 2/1998 | Wallace et al. | |
| 5,723,515 A | 3/1998 | Gottfried | |
| 5,942,561 A | 8/1999 | Okhsaki et al. | |
| 6,140,122 A | 10/2000 | Romet-Lemonne et al. | |
| 6,248,204 B1 | 6/2001 | Schuft | |
| 6,679,969 B1 | 1/2004 | Fournier et al. | |
| 6,730,411 B1* | 5/2004 | Doe | C09J 4/00 428/500 |
| 7,284,726 B2 | 10/2007 | Fabian et al. | |
| 8,026,307 B2 | 9/2011 | Miller | |
| 2002/0020827 A1 | 2/2002 | Munzenberger et al. | |
| 2002/0120024 A1 | 8/2002 | Koffler et al. | |
| 2003/0008119 A1 | 1/2003 | Tono et al. | |
| 2003/0175497 A1 | 9/2003 | Kobe et al. | |
| 2006/0254164 A1 | 11/2006 | Ueda et al. | |
| 2007/0101679 A1 | 5/2007 | Harthcock et al. | |
| 2008/0166484 A1* | 7/2008 | Smith | C08K 5/523 427/385.5 |
| 2011/0034577 A1 | 2/2011 | Peng et al. | |
| 2011/0039108 A1* | 2/2011 | Goeb | C09J 163/00 428/414 |
| 2011/0244245 A1* | 10/2011 | Elgimiabi | C08G 59/50 428/416 |
| 2012/0153242 A1 | 6/2012 | Le Bonte et al. | |
| 2012/0177877 A1 | 7/2012 | Lebail et al. | |
| 2013/0149531 A1* | 6/2013 | Kosal | C08L 63/00 428/354 |
| 2014/0171551 A1 | 6/2014 | Patel | |

FOREIGN PATENT DOCUMENTS

| | | | |
|---|---|---|---|
| CN | 1302828 A | | 7/2001 |
| CN | 101067465 A | | 11/2007 |
| CN | 102108236 A | * | 6/2011 |
| DE | 29719861 U1 | | 11/1997 |
| EP | 0814121 A1 | | 12/1997 |
| EP | 1095980 A1 | | 2/2001 |

(Continued)

OTHER PUBLICATIONS

BYK-4509, Adhesion promoter for solvent-born and aqueous systems applied to metallic substrates, Data sheet, pp. 1-2, issued 2012 (Year: 2012).*
European Office Action dated Mar. 24, 2015; Application No. 10740143.2.
Chinese Second Office Action dated Dec. 13, 2013; Application No. 201080027999.9.
Chinese Office Action dated Mar. 1, 2013; Application No. 201080027999.9.
Chinese Rejection Decision dated Jul. 18, 2014; Application No. 201080027999.9.
"The Epoxy Book", Published by System Three Resins, Inc. Seattle, 2000.
Born et al., Structural Bonding in Automotive Applications, Apr. 2004.

(Continued)

*Primary Examiner* — Randy P Gulakowski
*Assistant Examiner* — Ha S Nguyen
(74) *Attorney, Agent, or Firm* — The Dobrusin Law Firm, P.C.; Bryan S. Lemanski

(57) ABSTRACT

An adhesive material which comprises an epoxy component including a first flame retardant and a curing component which includes an adhesion promoter and a second flame retardant The epoxy component and curing component are present in a ratio of about 1:1 and the adhesive is formed when the epoxy component is combined with the curing component.

20 Claims, No Drawings

(56) References Cited

FOREIGN PATENT DOCUMENTS

| | | |
|---|---|---|
| EP | 2818490 A1 | 12/2014 |
| GB | 2252076 A | 7/1992 |
| JP | 7309976 A | 11/1995 |
| JP | 0948083 A | 2/1997 |
| JP | 9208731 A | 12/1997 |
| JP | 2000001558 A | 1/2000 |
| JP | 2000218736 A | 8/2000 |
| JP | 2001106926 A | 4/2001 |
| JP | 2004174865 A | 6/2004 |
| JP | 2007/204621 A | 8/2007 |
| JP | 2007254563 A | 10/2007 |
| WO | 03/048242 A1 | 6/2003 |
| WO | 2006/024676 A2 | 3/2006 |
| WO | 2007/050536 A1 | 5/2007 |
| WO | 2008045270 A1 | 4/2008 |
| WO | 2011/123356 A2 | 10/2011 |
| WO | 2014/125044 A1 | 8/2014 |
| WO | 2016/123597 A1 | 8/2016 |

OTHER PUBLICATIONS

Product Literature for Structural Adhesives and Structural Specialty Products, Oct. 14, 2005.
PCT Search Report dated Sep. 14, 2010 (Application No. PCT/EP2010/003778).
Database WPI Week 199807, Thomson Scientific, London, GB; AN 1998-066083, XP002600574 & JP 9 208731 A (Sekisui Chem Ind Co. Ltd) Aug. 12, 1997, *abstract.
Database WPI Week 200776, Thomson Scientific, London, GB; AN 2007-809222, XP002600575 & JP 2007 204621 A (Sumitomo Chem Co. Ltd) Aug. 16, 2007, *abstract.
Database WPI Week 199605, Thomson Scientific, London, GB; AN 1996-045451, XP002600576 & JP 7 309976 A (Hokushin Kogyo KK) Nov. 28, 1995, *abstract.
Database WPI Week 200012, Thomson Scientific, London, GB; AN 2000-130569, XP002600577 & JP 2000 001558 A (Mitsui Chem Inc.) Jan. 7, 2000, *abstract.
PCT Search Report dated Nov. 24, 2010 (Application No. PCT/EP2010/003777).
European Office Action dated Nov. 23, 2012; Application No. EP10757386.7.
Great Britain Search Report dated Sep. 9, 2010; Application No. GB0921695.3.
International Search Report for application No. PCT/US2015/063352. dated Mar. 26, 2016.
PCT Search Report & Written Opinion dated Aug. 25, 2016 Application No. PCT/US2016/035494.
International Search Report for application No. PCT/US2016/015887. dated May 20, 2016.
India First Exam Report dated Dec. 21, 2019, Application No. 201717027027.

* cited by examiner

ADHESIVE MATERIAL, AND METHOD OF USE THEREOF

FIELD OF INVENTION

The present teachings relate generally to an adhesive material. More particularly, the present teachings relate to an adhesive suitable for use in the aerospace industry.

BACKGROUND

Adhesives have been conventionally used for structural bonding in the transportation industry, particularly, the aerospace industry. There have been many improvements of adhesive strength to weight ratios, thereby reducing the amount of weight added to airplanes while exhibiting the necessary strength for withstanding the harsh environmental conditions airplanes may be exposed to. Epoxy adhesives, including two-component epoxy adhesives have seen widespread use in the aerospace industry, due to their light weight properties and available strength.

One problem is that currently available epoxy adhesives may not meet Federal Aviation Regulations for use inside an airplane's cabin. Depending on their use, adhesives need to pass either a 12-second Ignition Vertical Bunsen Burner Test or a 60-second Ignition Vertical Bunsen Burner Test. All floor coverings textiles, seat cushions, and the like within an airplane's interior compartment must meet the 12-second Ignition Vertical Bunsen Burner Test. Interior ceiling panels, interior wall panels, partitions, and other similar components in the interior compartment of an airplane must meet the 60-second Ignition Vertical Bunsen Burner Test.

Another problem with epoxy adhesives is that they have a long set-up time, requiring the surfaces they are adhering to be held in place while the adhesive cures. To hold the surfaces steady during curing, tooling such as fixtures and jigs are often used. These fixtures may be designed specifically for the surfaces that they are holding steady. When multiple surfaces need to be adhered with the epoxy adhesive, a few sets of custom fixtures may be created permitting the epoxy adhesive to be applied and cured on just a few surfaces at one time. The fixtures are reused over multiple days, weeks, or months until the epoxy adhesive has been applied and cured on all the necessary surfaces which may result in lengthy project duration times. To reduce the overall time spent on applying and curing adhesives, multiple fixtures or jigs may be utilized, permitting the epoxy adhesive to be applied and cured on a greater amount of surfaces at one time. The inherent problem with developing additional tooling, such as the fixtures or jigs, is the resulting additional equipment cost.

WO 2006/024676 describes a material composition which may be used as an intermediate adhesive or a topcoat or sealer. The material composition contains a resin, filler, chemical thixotropic agent, latent hardener, and another hardener and can be made by mixing two components, which may include an epoxy component containing a curable epoxy resin and a hardener component.

U.S. Pat. No. 6,248,204 describes a room-temperature curable, epoxy resin composition comprised of two components: an epoxy resin first component and an epoxy resin hardener second component. Either the first or second component includes an inorganic and/or organic filler component. The mixture becomes substantially tack-free within about 3 to about 5 hours after application onto a surface of a substrate at room temperature.

U.S. Pat. No. 8,026,307 describes a two component reactive resin that is formed when two separate reactive components are mixed together. A platelet structure or filler is dispersed in the reactive components and may provide flame retardancy of the cured resin.

US Patent Publication No. 2014/0171551 describes an epoxy resin composition having a curing component and an epoxy component. The epoxy resin has a pot life of about 20 minutes to about 8 hours.

The foregoing prior art does not address sufficiency of flame retardants for aviation requirements or burn test results. Accordingly, there remains a need to find lightweight and high-strength epoxy adhesive compositions that meet the Federal Aviation Regulations flammability requirements. Further, there is a need for two-component adhesives that have shorter set-up times to reduce both equipment costs and project duration.

SUMMARY OF INVENTION

The present disclosure relates to a material composition comprising: a) an epoxy component; and b) a curing component which includes an adhesion promoter; wherein an adhesive is formed when the epoxy component is combined with the curing component.

The present disclosure relates to a material composition comprising: a) an epoxy component comprising: an epoxy resin greater than or equal to about 10% or less than or equal to about 50% of the total material composition weight, a flame retardant greater than or equal to about 2% to less than or equal to about 10% of the total material composition weight, and b) a curing component comprising: an amine greater than or equal to about 15% to less than or equal to about 40% of the total material composition weight; a flame retardant greater than or equal to about 15% to less than or equal to about 50% the total material composition weight, a polymer salt as an adhesion promoter greater than or equal to about 3.5% to less than or equal to about 5% of the total material composition weight; wherein an adhesive is formed when the epoxy component is combined with the curing component and the adhesive has a set-up time of less than about 2 hours.

The present disclosure further relates to a material composition comprising: a) an epoxy component comprising: an epoxy resin greater than or equal to about 10% or less than or equal to about 50% of the total material composition weight, a flame retardant greater than or equal to about 2% to fess than or equal to about 10% of the total material composition weight, and b) a curing component comprising: an amine greater than or equal to about 15% to less than or equal to about 40% of the total material composition weight; a flame retardant greater than or equal to about 1% to less than or equal to about 30% the total material composition weight, a polymer salt as an adhesion promoter greater than or equal to about 3.5% to less than or equal to about 5% of the total material composition weight; wherein an adhesive is formed when the epoxy component is combined with the curing component and the adhesive has a flammability that meets the Federal Aviation Regulations' 60-second Ignition Vertical Bunsen Burner Test.

In some embodiments, the material composition according to the teachings herein may have a gel time greater than or equal to about five minutes and less than or equal to about twenty minutes after the epoxy component and the curing component have been combined. The adhesive may have a gel time greater than or equal to about three minutes and less than or equal to about 60 minutes after the epoxy component and the curing component have been combined. The adhesive may have a gel time greater than or equal to about three minutes and less than or equal to about 10 minutes after the epoxy component and the curing component have been combined. The adhesive has a gel time greater than or equal to about 30 minutes and less than or equal to about 60 minutes after the epoxy component and the curing component have been combined. The adhesive may have a Shore D hardness greater than or equal to about 70. When the composition adhesively joins two surfaces, the lap shear strength where the two surfaces are joined after the adhesive has cured may be greater than or equal to about 1500 psi. When the composition adhesively joins two surfaces, the lap shear strength where the two surfaces are joined after the adhesive has cured may be greater than or equal to about 2000 psi. When the composition adhesively joins two surfaces, the lap shear strength where the two surfaces are joined after the adhesive has cured may be greater than or equal to about 2500 psi.

The adhesion promoter may be an amine or epoxy functional molecule. The adhesion promoter may be methoxypropanol. The adhesion promoter may be a polymer salt. The adhesion promoter may be present in an amount that is greater than or equal to about 0.5% to less than or equal to about 15% of the total material composition weight. The epoxy component may include an epoxy resin and the epoxy resin may be present in an amount of greater than or equal to about 10% to less than or equal to about 50% by weight of the total composition weight. The curing component may include an amine and the amine is present in an amount greater than or equal to about 15% to less than or equal to about 40% by weight of the total material composition weight. The adhesive may have a set-up time of greater than or equal to about 50 minutes to less than or equal to about 100 minutes. The first flame retardant may comprise greater than or equal to about 2% to less than or equal to about 10% by weight of the total material composition weight. The second flame retardant may comprise greater than or equal to about 10% to less than or equal to about 30% of the total material composition weight. The epoxy component and curing component may be present in a ratio of about 1:1.

The adhesive may be adapted to adhere two surfaces of an interior component of an aircraft cabin. The adhesive may be adapted for potting inserts and/or fixtures within a panel structure.

In some embodiments, according to the teachings herein, the material composition may have a setup time of the adhesive greater than or equal to about 50 minutes to less than or equal to about 100 minutes. In some embodiments, according to the teachings herein, the material composition may include an epoxy component and curing component combined in equal ratios by weight to form the adhesive. In some embodiments, the material composition according to the teachings herein, may be adapted to join two surfaces of an interior of an aircraft cabin.

The material composition of the disclosure may be an adhesive suitable for use in the aerospace industry. In the embodiments wherein the shear strength may be greater than or equal to about 2,500 psi, the material composition may provide sufficient strength for aerospace use. In the embodiments wherein the material composition may meet the 60 section Ignition Vertical Bunsen Burner Test, the flammability properties of the material composition may meet Federal Aviation Regulation standards for aircraft interior cabin use. In the embodiments wherein the material composition may have a setup time of between 50 minutes and 100 minutes, the set-up time is much shorter than other epoxy adhesives.

DETAILED DESCRIPTION OF THE INVENTION

The explanations and illustrations presented herein are intended to acquaint others skilled in the art with the invention, its principles, and its practical application. Accordingly, the specific embodiments of the present disclosure as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present application claims the benefit of the priority date of U.S. Provisional Application Ser. No. 62/109,719, filed Jan. 30, 2015, the contents of this application being hereby incorporated by reference for all purposes.

The present teachings relate to a material composition which may serve as an adhesive. Typically, in addition to adhesion, the material composition may assist in providing structural reinforcement, sealing, acoustical damping properties, or a combination thereof to and/or between members to which the adhesive material is adhered. The adhesive material of the teachings herein may be applied to various articles of manufacture for adding structural integrity to portions or members of articles, for providing acoustical damping to the articles or for sealing articles. Examples of such articles of manufacture include, without limitation, household or industrial appliances, furniture, storage containers, buildings, structures or the like. In some embodiments, the adhesive material may be applied to portions of a transportation vehicle. It has been found that the adhesive material is particularly useful for adhering to members of airplanes or other aerospace vehicles. It has also been found that the adhesive material may be particularly useful for adhering members within the interior cabin of airplanes or other aerospace vehicles.

The present teachings relate to a two part material composition which may be comprised of an epoxy component and a curing component. The curing component may include an adhesion promoter. An adhesive may be formed when the epoxy component is combined with the curing component.

The material composition may further comprise any one or more of the features described in this specification in any combination, including the preferences and examples listed in this specification, and includes the following features: the adhesive after it has cured may have a flammability that meets or exceeds the Federal Aviation Regulations (FAR) 60-Second Ignition Vertical Bunsen Burner Test; when the adhesive has cured, after applying a flame for about 60-seconds the material composition may have about a 6.0" burn length or less, the flame may take about 15 seconds or less to extinguish, and drippings from the adhesive may not continue to flame for more than about 3 seconds after falling; the adhesive after it has cured may have a flammability that meets or exceeds the Federal Aviation Regulations (FAR) 12-Second Ignition Vertical Bunsen Burner Test; when the adhesive has cured, after applying a flame for about 12-seconds the material composition may have about an 8.0" burn length or less, the flame may take about 15 seconds or less to extinguish, and drippings from the adhesive may not continue to flame for more than about 3 seconds after falling; The adhesive may comprise an epoxy resin. Epoxy resin is used herein to mean any of the conventional dimeric, oligomeric, or polymeric epoxy materials containing at least one epoxy functional group. The epoxy resin may be a bisphenol-A epoxy resin. The epoxy resin may comprise from about 2% to about 80% by weight of the adhesive. The epoxy resin may comprise from about 10% to about 50% of the total material composition weight. The epoxy resin may comprise at least about 15% by weight of the adhesive. The epoxy resin may comprise less than about 60% by weight of the adhesive. The epoxy resin may be a liquid or a solid epoxy resin or may be a combination of liquid and solid epoxy resins.

The adhesive may also include an epoxy/elastomer adduct. The adduct may comprise from about 0.5% to about 20% by weight of the adhesive. The adduct may comprise at least about 1% by weight of the adhesive. The adduct may comprise at least about 15% by weight of the adhesive. The adduct itself generally includes about 1:5 to 5:1 parts of epoxy to elastomer, or even about 1:3 to 3:1 parts of epoxy to elastomer. Examples of suitable adducts include a bisphenol A carboxyl terminated butadiene acrylonitrile liquid material.

One or more curing agents and/or curing agent accelerators may be added to the adhesive material. Amounts of curing agents and curing agent accelerators can vary widely within the material composition depending upon the type of cellular structure desired, the desired amount of expansion of the adhesive material, the desired rate of expansion, the desired structural properties of the adhesive material, the desired cure conditions (e.g., manufacturing conditions) and the like. Exemplary ranges for the curing agents or curing agent accelerators present in the material composition may range from about 0.01% to about 50% by weight, or even 15% by weight to about 40% by weight.

Examples of suitable curing agents include materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), or mixtures thereof. Particular curing agents include modified and unmodified polyamines or polyamides such as triethylenetetramine, diethylenetriamine tetraethylenepentamine, cyanoguanidine, dicyandiamides and the like. One such curing agent may be Ancamine 1768® provided by Air Products of Allentown, Pa. Another possible curing agent is dihydrazides, particularly isophthalic dihydrazide. An accelerator for the curing agents (e.g., a modified or unmodified urea such as methylene diphenyl bis urea, an imidazole or a combination thereof) may also be provided for preparing the adhesive. Another possible accelerator for curing agents is dipentaerythritol pentaacrylate (SR-399).

Desirable cure times can vary depending upon manufacturing processes and other factors. Moreover, such curing times can depend upon whether additional energy (e.g., heat, light, radiation) is applied to the material or whether material is cured at room temperature.

The material composition may also include one or more fillers, including but not limited to particulate materials (e.g. powder), beads, microspheres, or the like. The filler may include a relatively low-density material that is generally non-reactive with the other components present in the adhesive material.

Examples of suitable fillers include silica, MIOX, fumed silica, wollastonite, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. An exemplary fumed silica filler may be AEROSIL® 208, available from Evonik industries located in Picataway, N.J. Exemplary glass fillers may be Sphericel® 34P30 or Potters 7023, available from Potters industries of Malvern, Pa. Such fillers, particularly clays, can assist the adhesive material in leveling itself during flow of the material. The clays that may be used as fillers may include days from the kaolinite, illite, chloritem, smecitite or sepiolite groups, which may be calcined. One such filler may include a Garamite® product, available from Southern Clay Products, Inc. of Gonzales, Tex. One or more mineral or stone type fillers such as calcium carbonate, sodium carbonate or the like may be used as fillers. Such mineral fillers may improve the stiffness of the cured adhesive and assist in improving the viscosity of the adhesive to its desired level. Examples of additional suitable fillers include, without limitation, talc, vermiculite, pyrophyllite, sauconite, saponite, nontronite, montmorillonite or mixtures thereof. In another embodiment, silicate minerals such as mica may be used as fillers. The filler may include a material that is generally non-reactive with the other components present in the activatable material. While the fillers may generally be present within the activatable material to take up space at a relatively low weight, it is contemplated that the fillers may also impart properties such as strength and impact resistance to the activatable material.

When employed, the fillers in the adhesive material can range from about 0.0001% to about 90% by weight of the material composition, from about 1% to about 30% by weight, or even from about 2% to about 10% by weight.

It is contemplated that one of the fillers or other components of the material may be thixotropic for assisting in controlling flow of the material as well as properties such as tensile, compressive or shear strength. The material composition may further include adhesion promoters to aid the material composition in adhering with metallic substrates, which may improve adhesion to steel, galvanized steel, aluminum, and also glass. An example of a suitable adhesion promoter is methoxypropanol. Another such adhesive promoter is BYK-4509® provided by BYK, a business unit of ALTANA of Wesel, Germany.

When employed, the adhesion promoters can range from about 0.0001% to about 90% by weight of the material composition, about 1% to about 10% weight, or even about 3.5% to about 5% weight.

Other additives, agents, or performance modifiers may also be included in the material composition as desired, including but not limited to a UV resistant agent, a flame retardant, an impact modifier, a heat stabilizer, a UV photo initiator, a colorant, a processing aid, a lubricant, a reinforcement (e.g., chopped or continuous glass, ceramic, aramid (e.g., aramid pulp), or carbon fiber or the like).

When employed, the flame retardants in the adhesive material can range from about 0.0001% to about 90% by weight of the material composition, from about 1% to about 50% by weight, or even from about 10% to about 40% by weight. An exemplary flame retardant suitable for the material composition include ammonium polyphosphate. One such flame retardant may be JLS-PNP1C® provided by JLS Chemical of Pomona, Calif.

Formation of the adhesive material can be accomplished according to a variety of new or known techniques. The adhesive material may be formed as a material of substantially homogeneous composition. However, it is contemplated that various combining techniques may be used to increase or decrease the concentration of certain components in certain locations of the adhesive material.

The adhesive material may begin as various components premixed into one, two, or more pre-mixtures. The adhesive material may begin as two separate reactive components which may include the materials disclosed in this teaching. One component may be an epoxy component and one component may be a curing component. The epoxy component may include one or more epoxy resins, one or more epoxy/elastomer adducts, and one or more other additives, agents, or performance modifiers. The curing component may include one or more curing agents, one or more adhesion promoters, and one or more other additives, agents, or performance modifiers.

Activation of the adhesive may include mixing of the components until a homogenous mixture is achieved, which may be a curable resin. The adhesive may then be applied to a substrate and substantially wet the substrate to form an intimate bond. Heat may be applied to cure the adhesive material.

Advantageously, the adhesive material of the teachings herein, may exhibit valuable properties for flammability, lap shear, and strength. Once the adhesive material has cured, it may have a flammability meeting the Federal Aviation Regulations (FAR) 12-second Ignition Vertical Bunsen Burner Test, and a flammability meeting the Federal Aviation Regulations (FAR) 60-second Ignition Vertical Bunsen Burner Test. The adhesive material, once it has cured, may have lap shear strength greater than about 2000 psi, often greater than about 2500 psi, and can be greater than about 3000 psi.

In one embodiment, the adhesive material of the teachings herein may be used to adhere substrates to form interior components of an airplane cabin. An example of such an interior components is the overhead bins in an airplane cabin. A first substrate may be placed in a fixture to allow the adhesive material to be applied at specific location(s) of the substrate's surface. Either manually or with the aid of tooling, a second substrate may then be adhered to the first substrate. The same fixture or a different fixture may hold the two substrates in a steady position until the adhesive material has set-up, thus allowing the two substrates to be handled manually or with the aid of tooling, without either of the two substrates shifting in relationship to the other substrate.

Exemplary adhesive materials that are particularly suitable for use as the adhesive taught herein are described below in Table 1.

TABLE 1

| Material | Example 1 | Example 2 |
|---|---|---|
| Epoxy Component | | |
| Liquid Epoxy Resin | 40.00 | 28.00 |
| Phenol Novolac Epoxy Resin | 0.00 | 15.00 |
| Flame Retardant | 8.60 | 4.00 |
| Acrylate | 0.00 | 15.00 |
| Curing Agent Accelerator | 0.00 | 3.0 |
| Fumed Silica | 1.40 | 15.00 |

TABLE 1-continued

| Material | Example 1 | Example 2 |
|---|---|---|
| Curing Component | | |
| Fumed Silica | 1.80 | 0.75 |
| Amine Curing Agent | 20.00 | 30.00 |
| Hollow Glass Spheres | 0.00 | 2.50 |
| Adhesion Promoter | 4.50 | 4.00 |
| Flame Retardant | 23.70 | 12.75 |
| Total | 100.00 | 100.00 |
| Ratio (Epoxy Component to Curing Component) | 1:1 | 1:1 |

Example 1

Federal Aviation Regulation 12-Second Ignition Vertical Bunsen Burner Testing

A sample of the adhesive material of the teachings herein is applied to a sample (what is the material applied to for the test) and allowed to cure. The adhesive material is conditioned for 24 hours minimum at 70+/−5 degrees Fahrenheit and 50%+/−5% relative humidity. A flame greater than or equal to 1550 degrees Fahrenheit is applied to the adhesive material. The flame is applied to the adhesive material for about 12 seconds. After 12 seconds, the flame is removed. Three measurements are then taken burn length, flame extinguish time, and drip extinguish time. The burn length is the amount of length the flame travels up the sample. The flame extinguish time is how long the sample continues to burn after the flame is removed. The drip extinguish time is how long any drippings from the sample continue to burn. For the Federal Aviation Regulation 12-second ignition Vertical Bunsen Burner Test, the flame may not continue to burn greater than 15 seconds, the burn length may not be greater than 8 inches, and the drip extinguish time must be less than 5 seconds.

Example 2

Federal Aviation Regulation 60-Second Ignition Vertical Bunsen Burner Testing

The Federal Aviation Regulation 60-Second Vertical Bunsen Burner Test is conducted in the same manner as the 12-second Ignition Vertical Bunsen Burner Test of Example 1, except the flame is applied for a longer duration and the test result requirements are different. For the 60-second test, a flame is applied to the sample for about 60 seconds. After 60 seconds, the flame is removed. For the Federal Aviation Regulation 60-second ignition Vertical Bunsen Burner Test, the flame may not continue to burn greater than 15 seconds, the burn length may not be greater than 6 inches, and the drip extinguish time must be less than 3 seconds.

Example 3

Tensile Testing

A first steel plate is adjoined to a second steel plate with an adhesive material based on the teachings herein. The adhesive material is applied to a 2 inch by 2 inch portion of the first steel plate and the second steel plate is then adhered to the first steel plate. The steel plates are then affixed to the mechanical test machine which exerts force to pull apart the steel plates. The portion of the steel panels adhered by the adhesive material is pulled apart at a rate of 0.5 mm per minute until failure results, such as by the steel fracturing or the adhesive material failing.

Example 4

Shear Testing

A first steel plate is adjoined to a second steel plate with an adhesive material based on the teachings herein. The adhesive material is applied to a ½ inch by 1 inch portion of the first aluminum plate and the second aluminum plate is then adhered to the first steel plate. The portion of the steel plates adhered by the adhesive material is placed in a mechanical testing machine and compressed at a rate of 0.5 mm per minute until failure results, such as by the steel fracturing or the adhesive material failing.

Example 5

Torque Testing

An insert is bonded with an adhesive material according to the teachings herein into a honeycomb panel. 50 inch pounds of torque is applied to the insert within 1.5 hours of dispensing the adhesive without adhesive failure of the adhesive.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the invention of a range in terms of at "x parts by weight of the resulting polymeric blend composition" also contemplates a teaching of ranges of same recited amount of "x in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consists of, the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1. Teachings of concentrations in the examples may be varied within about 25% (or higher) of the stated values and similar results are expected. Moreover, such compositions of the examples may be employed successfully in the present methods.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not. It is understood that the above description is intended to be illustrative and not restrictive. Many embodiments as well as many applications besides the examples provided will be apparent to those of skill in the art upon reading the above description.

The explanations and illustrations presented herein are intended to acquaint others skilled in the art with the invention its principles, and its practical application. Those skilled in the art may adapt and apply the teachings in their numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A two-part composition comprising:
(a) an epoxy component including a first flame retardant, a liquid epoxy resin, an adduct that is bisphenol A carboxyl terminated butadiene acrylonitrile, phenol novolac epoxy resin, and an acrylate, wherein the epoxy resins comprise about 15% to about 60% by weight of the total material composition weight; and
(b) a curing component which includes an adhesion promoter that includes methoxypropanol, a second flame retardant, and hollow glass spheres;
wherein an adhesive is formed to join two surfaces when the epoxy component is combined with the curing component, and the epoxy component and the curing component are present in a ratio of about 1:1;
wherein the adhesive also includes one or more fillers that are thixotropic, a curing agent that is isophthalic dihydrazide, and an accelerator that is methylene diphenyl bis urea;
wherein the first flame retardant and the second flame retardant are ammonium polyphosphate, and both the epoxy component and the curing component include fumed silica; and
wherein the adhesive has a set-up time of less than about 2 hours.

2. The composition of claim 1, wherein after cure, upon applying a flame for about 80-seconds the material composition has about a 6.0" burn length or less, the flame takes about 15 seconds or less to extinguish, and drippings from the adhesive do not continue to flame for more than about 3 seconds after falling.

3. The composition of claim 1, wherein after cure, upon applying a flame to the material composition for 12-seconds the material composition has about a 8.0" burn length or less, the flame takes about 15 seconds or less to extinguish, and drippings from the adhesive do not continue to flame for more than about 3 seconds after falling.

4. The composition of claim 3, wherein the adhesive has a gel time greater than or equal to about three minutes and less than or equal to about 60 minutes after the epoxy component and the curing component have been combined.

5. The composition of claim 2, wherein the adhesive has a gel time greater than or equal to about three minutes and less than or equal to about 10 minutes after the epoxy component and the curing component have been combined.

6. The composition of claim 2 wherein the adhesive has a gel time greater than or equal to about 5 minutes and less than or equal to about 20 minutes after the epoxy component and the curing component have been combined.

7. The composition of claim 1 wherein the adhesive has a gel time greater than or equal to about 30 minutes and less than or equal to about 60 minutes after the epoxy component and the curing component have been combined.

8. The composition of claim 3, wherein after cure, the adhesive has a Shore D hardness greater than or equal to about 70.

9. The composition of claim 8, wherein when the composition adhesively joins the two surfaces, the lap shear strength where the two surfaces are joined after the adhesive has cured is greater than or equal to about 1500 psi.

10. The composition of claim 8, wherein when the composition adhesively joins the two surfaces, the lap shear strength where the two surfaces are joined after the adhesive has cured is greater than or equal to about 2000 psi.

11. The composition of claim 8, wherein when the composition adhesively joins the two surfaces, the lap shear strength where the two surfaces are joined after the adhesive has cured is greater than or equal to about 2500 psi.

12. The composition of claim 2, wherein the adhesion promoter is present in an amount of greater than or equal to about 0.5% to less than or equal to about 15% of the total material composition weight.

13. The composition of claim 8, wherein the phenol novolac epoxy resin is present in an amount of 13% by weight of the total composition weight.

14. The composition of claim 13, wherein the curing component includes an amine and the amine is present in an amount greater than or equal to about 15% to less than or equal to about 40% by weight of the total material composition weight.

15. The composition of claim 1, wherein the adhesive adheres surfaces of an interior component of an aircraft cabin or for potting inserts and/or fixtures within a panel structure.

16. The composition of claim 14, wherein the first flame retardant comprises greater than or equal to about 2% to less than or equal to about 10% by weight of the total material composition weight.

17. A composition comprising:
(a) an epoxy component comprising:
 (i) a combination of liquid and solid epoxy resins greater than or equal to about 10% to less than or equal to about 50% of the total material composition weight, wherein the liquid and solid epoxy resins include a phenol novolac epoxy resin and an adduct that is bisphenol A carboxyl terminated butadiene acrylonitrile; and
 (ii) a flame retardant that is ammonium polyphosphate and greater than or equal to about 2% to less than or equal to about 10% of the total material composition weight; and
(b) a curing component comprising:
 (i) an amine greater than or equal to about 15% to less than or equal to about 40% of the total material composition weight;
 (ii) a flame retardant that is ammonium polyphosphate and greater than or equal to about 10% to less than or equal to about 30% the total material composition weight;
 (iii) a polymer salt as an adhesion promoter, greater than or equal to about 3.5% to less than or equal to about 5% of the total material composition weight;
 (iv) one or more fillers that are in an amount of about 2% to about 10% by weight of the total material composition weight, wherein the one or more fillers includes hollow glass spheres and at least one of the one or more fillers is thixotropic;
 (v) a curing agent that is isophthalic dihydrazide; and
 (vi) a curing agent accelerator that is methylene diphenyl bis urea;
wherein an adhesive is formed when the epoxy component is combined with the curing component and the adhesive has a set-up time of less than about 2 hours.

18. The composition of claim 1, wherein the composition further includes a mineral filler present in an amount of about 2% to about 10% by weight of the total material composition weight.

19. The composition of claim 17, wherein both the epoxy component and the curing component include fumed silica.

20. The composition of claim 19, wherein phenol novolac epoxy resin is present in an amount of 13% by weight of the total material composition weight.

\* \* \* \* \*